US010356058B2

(12) United States Patent
Camenisch et al.

(10) Patent No.: US 10,356,058 B2
(45) Date of Patent: Jul. 16, 2019

(54) ENCRYPTED MESSAGE COMMUNICATION

(71) Applicant: International Business Machines Corporation, Armonk, NY (US)

(72) Inventors: Jan L. Camenisch, Thalwil (CH); Anja Lehmann, Zurich (CH); Gregory Neven, Oberrieden (CH); Kai Samelin, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 14/872,695

(22) Filed: Oct. 1, 2015

(65) Prior Publication Data

US 2017/0099268 A1   Apr. 6, 2017

(51) Int. Cl.
*H04L 9/32* (2006.01)
*H04L 29/06* (2006.01)

(52) U.S. Cl.
CPC ........ *H04L 63/0435* (2013.01); *H04L 9/3226* (2013.01); *H04L 63/061* (2013.01); *H04L 63/083* (2013.01); *H04L 63/18* (2013.01)

(58) Field of Classification Search
CPC . H04L 63/0428; H04L 63/061; H04L 63/083; H04L 63/0435; H04L 63/166; H04L 63/20; H04L 63/10; H04L 67/02; H04L 67/10; H04L 63/0442; H04L 63/062; H04L 51/14; H04L 51/08
See application file for complete search history.

(56) References Cited

U.S. PATENT DOCUMENTS 8,560,843 B1 * 10/2013 Moscaritolo ........ H04L 63/0428
713/162
8,589,673 B2 * 11/2013 Ackerly .............. G06F 21/6218
713/155

(Continued)

FOREIGN PATENT DOCUMENTS

EP    1 737 156 A2   12/2006

*Primary Examiner* — Tae K Kim
(74) *Attorney, Agent, or Firm* — Scully, Scott, Murphy & Presser, P.C.; Daniel Morris, Esq.

(57) ABSTRACT

Computer-implemented methods are provided for communicating message data from a sender computer to a receiver computer via a network. The sender computer encrypts the message data in dependence on a cryptographic key to produce a ciphertext, and establishes an access password for the ciphertext with a host computer connected to the network. The sender computer sends the ciphertext via the network to the host computer, and sends an email, containing the cryptographic key in cleartext, to the receiver computer via the network. The cryptographic key comprises a random cryptographic value which is independent of the access password. The host computer receives the ciphertext from the sender computer and stores the ciphertext in association with the access password. The receiver computer receives the email from the sender computer and sends an access request for the ciphertext, and an input password, to the host computer via the network. The host computer, on receiving the access request and the input password, sends the ciphertext to the receiver computer via the network if the input password equals the access password. The receiver computer decrypts the received ciphertext using the cryptographic key to obtain the message data.

22 Claims, 5 Drawing Sheets

(56) References Cited

U.S. PATENT DOCUMENTS

Figure 1:
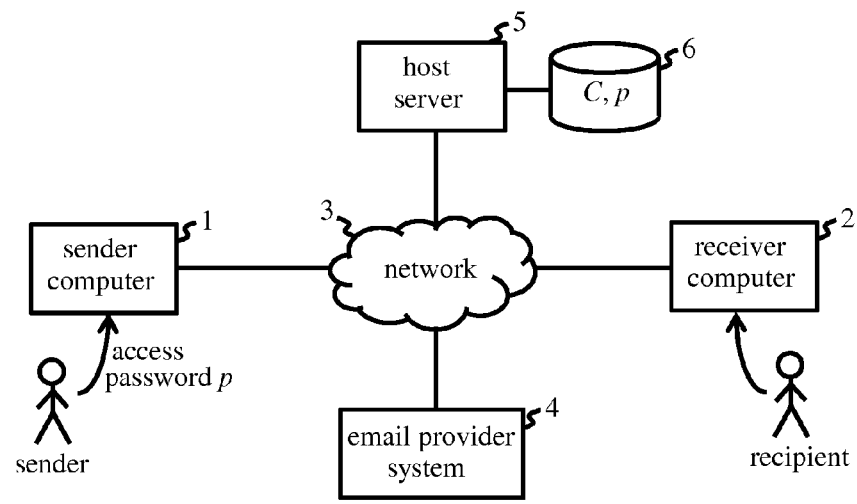

| | | | | |
|---|---|---|---|---|
| 8,837,739 B1* | 9/2014 | Sexton | ............... | H04L 9/0827 |
| | | | | 380/278 |
| 9,825,924 B2* | 11/2017 | Huang | ............... | H04L 63/0435 |
| 2007/0269041 A1* | 11/2007 | Bhatnagar | ........... | H04L 63/0428 |
| | | | | 380/30 |
| 2009/0006851 A1* | 1/2009 | Freeman | ............ | H04L 63/0442 |
| | | | | 713/170 |
| 2010/0241847 A1* | 9/2010 | van der Horst | ..... | H04L 63/0428 |
| | | | | 713/152 |
| 2010/0306537 A1* | 12/2010 | Cohen | ............... | H04L 63/0428 |
| | | | | 713/168 |
| 2012/0179905 A1* | 7/2012 | Ackerly | ............ | G06F 21/6218 |
| | | | | 713/155 |
| 2013/0318347 A1* | 11/2013 | Moffat | ................... | H04L 63/08 |
| | | | | 713/168 |
| 2015/0026469 A1* | 1/2015 | Pizano | ................. | H04L 9/3231 |
| | | | | 713/168 |
| 2015/0381588 A1* | 12/2015 | Huang | ............... | H04L 63/0435 |
| | | | | 713/153 |

* cited by examiner

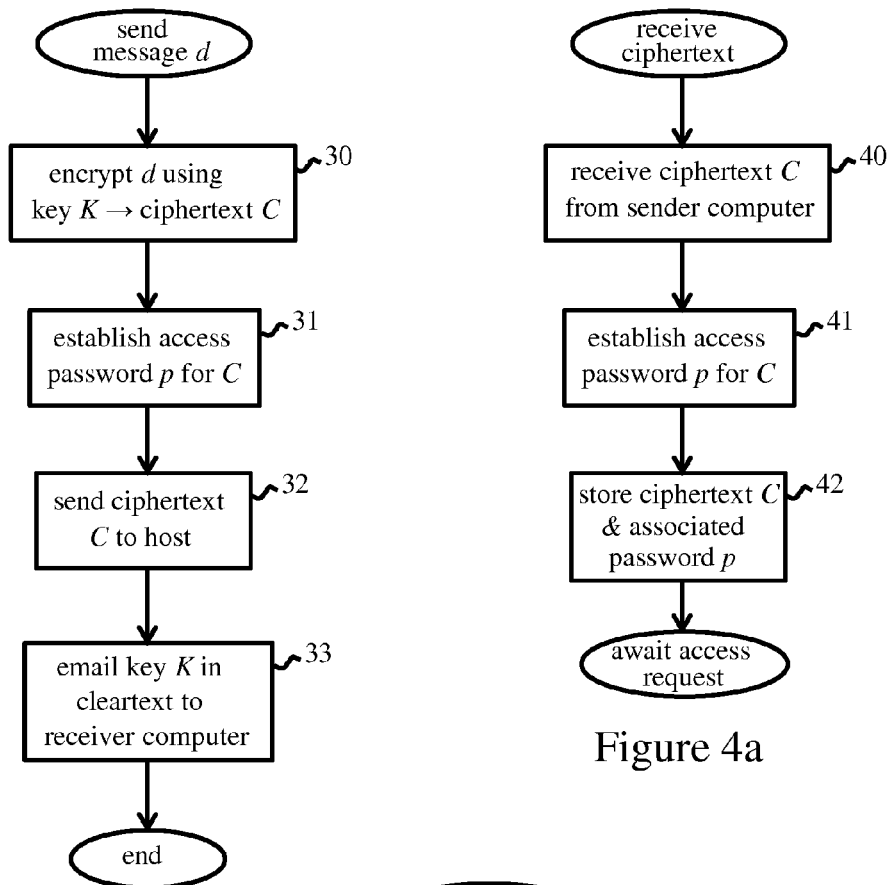
Figure 3
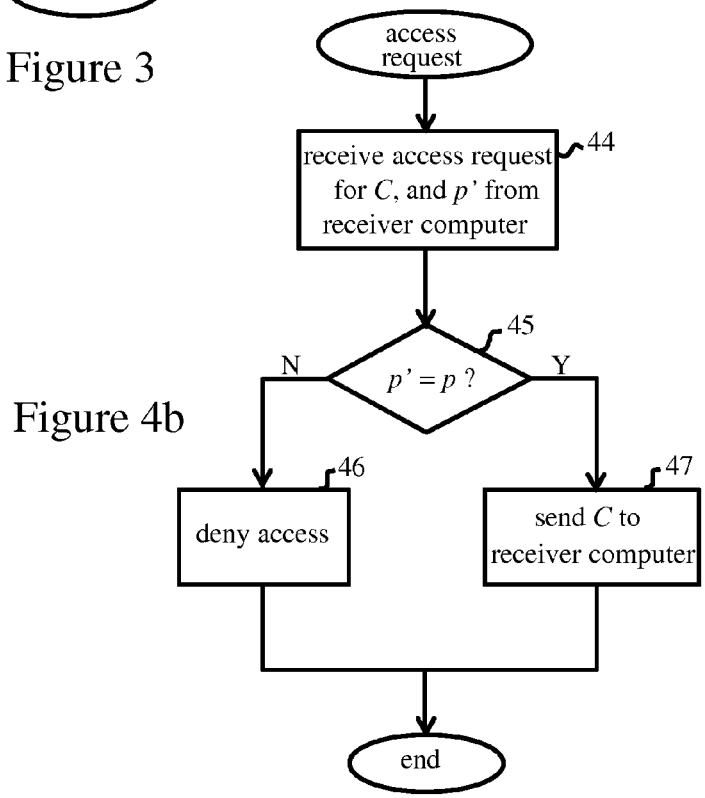
Figure 4a
Figure 4b

ENCRYPTED MESSAGE COMMUNICATION

BACKGROUND

The present invention relates generally to encrypted message communication, and more specifically to communication of message data via a network from a sender computer to a receiver computer, using encryption to protect the message data.

Today, most people still do not encrypt their email. This is generally because the communicating parties do not own certified public-private key pairs. The exchange of sensitive message data is therefore problematical. Users can download special encryption software, encrypt the data with this software, and send the resulting ciphertexts via email. However, users still need to securely exchange the (symmetric) encryption keys. Proper cryptographic encryption keys are based on random cryptographic values. The degree of randomness, or "entropy", in these values inhibits determination of the key by guesswork. Such keys comprise long (e.g. 120 bit) strings of (cryptographically-random) bits, and secure communication of these keys generally requires use of certified public-private key pairs. Therefore, instead of choosing proper high-entropy encryption keys, users typically use (low-entropy) human-memorizable passwords as encryption keys. These can conveniently be exchanged personally, e.g. by phone or text. The drawback of this approach is that the email provider can launch offline password-guessing attacks on the encrypted data. As modern hardware can try billions of passwords per second, use of encryption keys based on passwords makes the system fundamentally insecure.

Another way to exchange sensitive message data is to use a specialist third-party service such as those offered at turtl.it, zoho.com and dropbox.com. However, these services require users to subscribe to the website and/or install additional trusted software, which may not be possible or desirable. In addition, encryption here may be performed by the service provider itself and/or using password-based keys so that a recipient with the password can decrypt the sender's message. Some systems involve use of public-private key pairs for communication of passwords. However, the third-party host can either access messages directly or simply by performing an offline attack on the password.

SUMMARY

According to at least one embodiment of the present invention there is provided a computer-implemented method for communicating message data from a sender computer to a receiver computer via a network. The method comprises, at the sender computer, encrypting the message data in dependence on a cryptographic key to produce a ciphertext, and establishing an access password for the ciphertext with a host computer connected to the network. The method includes, at the sender computer, sending the ciphertext via the network to the host computer for storage in association with the access password by the host computer. The method further includes, at the sender computer, sending an email, containing the cryptographic key in cleartext, to the receiver computer via the network. The cryptographic key comprises a random cryptographic value which is independent of the access password.

In methods embodying the invention, the sender computer uses an encryption key comprising a random cryptographic value, and this value is independent of the access password. Therefore the key cannot be determined simply through knowledge of the password, and the random cryptographic value inhibits determination of the key by guesswork. The key is emailed in cleartext to the receiver, obviating the need for public/private key pairs (though the email transport can still be encrypted as explained below). A recipient in possession of the access password, which may conveniently be communicated personally, can present the password to obtain the ciphertext from the host computer, and then decrypt the ciphertext using the key. An email provider can see the key but does not have the ciphertext or know the password to gain access to the ciphertext. The host does not know the key and so cannot decrypt the ciphertext. Methods embodying the invention thus provide an elegantly simple system for encrypted message communication which is secure under reasonable assumptions yet does not require installation by users of specialist trusted software or possession of certified key pairs.

Preferred methods include, at the sender computer, sending the access password to the host computer with the ciphertext, receiving from the host computer a link to the stored ciphertext, and sending the link to the receiver computer. This allows use of different passwords for different ciphertexts and hence different messages sent by the sender, e.g. different passwords for different recipients or different messages/sets of messages sent to a recipient. The system can thus be implemented such that a given recipient can access only his own ciphertext(s). Conveniently, the sender computer can send the link to the receiver computer by sending an email, containing the link in cleartext, via the network. For simplicity, this email can be the same email as that containing the key.

For extra security, the sender computer preferably generates the cryptographic key as a unique key for the message data. Communications with the host and email provider system can also be performed over secure communications channels.

The access password can be communicated to the receiver computer independently of the email provider system via which the key is emailed, so that the sender computer does not send the password by email via this email-provider system. The access password can conveniently be communicated personally by the sender to the recipient, for example by phone. In some embodiments, however, the sender computer may send the access password to the receiver computer via a communications channel which is independent of the email-provider system via which the key is emailed to the receiver computer.

At least one further embodiment of the present invention provides a computer-implemented method for communicating message data between a sender computer and a receiver computer via a network. The method includes, at a host computer connected to the network, receiving a ciphertext, encrypting the message data, from the sender computer via the network. The method also includes, at the host computer, establishing an access password for the ciphertext with the sender computer, and storing the ciphertext in association with the access password. The method further includes, at the host computer, receiving an access request for the ciphertext, and an input password, from the receiver computer via the network, and sending the ciphertext via the network to the receiver computer if the input password equals the access password.

The host computer thus performs access control for ciphertexts based on the password supplied by receiver computers. Preferred methods include, at the host computer, implementing a throttling mechanism for access requests for the ciphertext in dependence on whether the input password equals the access password. This feature, discussed further below, frustrates on-line password-guessing attacks in a malicious attempt to access ciphertexts.

At least one additional embodiment of the present invention provides a computer-program product for communicating message data between a sender computer and a receiver computer via a network, the computer-program product comprising a computer-readable storage medium having program instructions embodied therein, the program instructions being executable by a host computer connected to the network to cause the host computer to perform a method according to an embodiment above.

At least one further embodiment of the present invention provides a computer-implemented method for receiving message data from a sender computer via a network, wherein the message data is encrypted, in dependence on a cryptographic key, in a ciphertext produced by the sender computer and the ciphertext is stored by a host computer connected to the network in association with an access password. The method includes, at a receiver computer connected to the network, receiving an email, containing the cryptographic key in cleartext, from the sender computer via the network. The method also includes, at the receiver computer, sending an access request for the ciphertext, and the access password, to the host computer via the network, and receiving the ciphertext from the host computer via the network. The method further includes, at the receiver computer, decrypting the ciphertext using the cryptographic key to obtain said message data. As discussed earlier, the receiver computer can receive the access password independently of the email-provider system via which the key is emailed to the receiver computer, e.g. via user input of a password communicated personally by the sender.

At least one further embodiment of the present invention provides a computer-implemented method for communicating message data from a sender computer to a receiver computer via a network, the method comprising steps performed by the sender computer, host computer and receiver computer in embodiments above.

Embodiments of the invention will be described in more detail below, by way of illustrative and non-limiting example, with reference to the accompanying drawings.

BRIEF DESCRIPTION OF THE SEVERAL
VIEWS OF THE DRAWINGS

Figure 2:
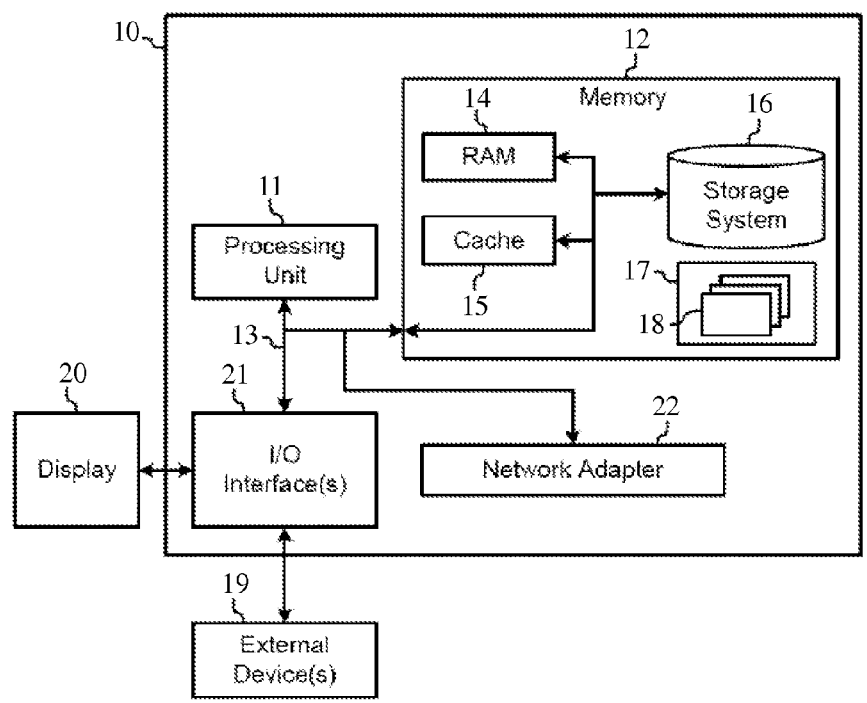
Figure 5:
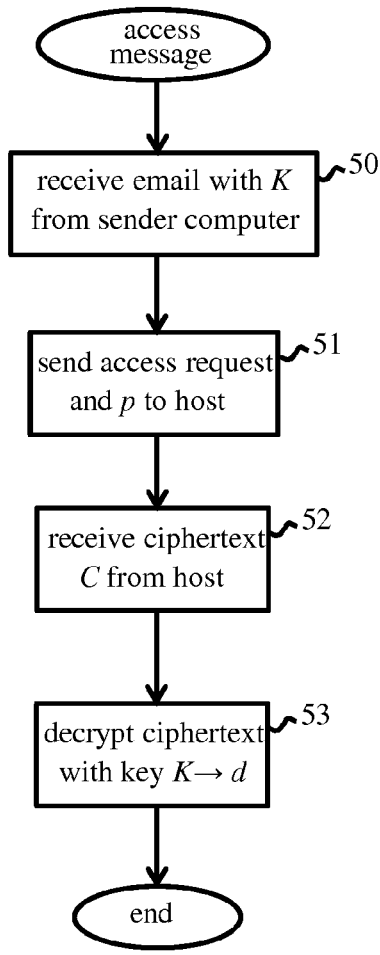
Figure 6:
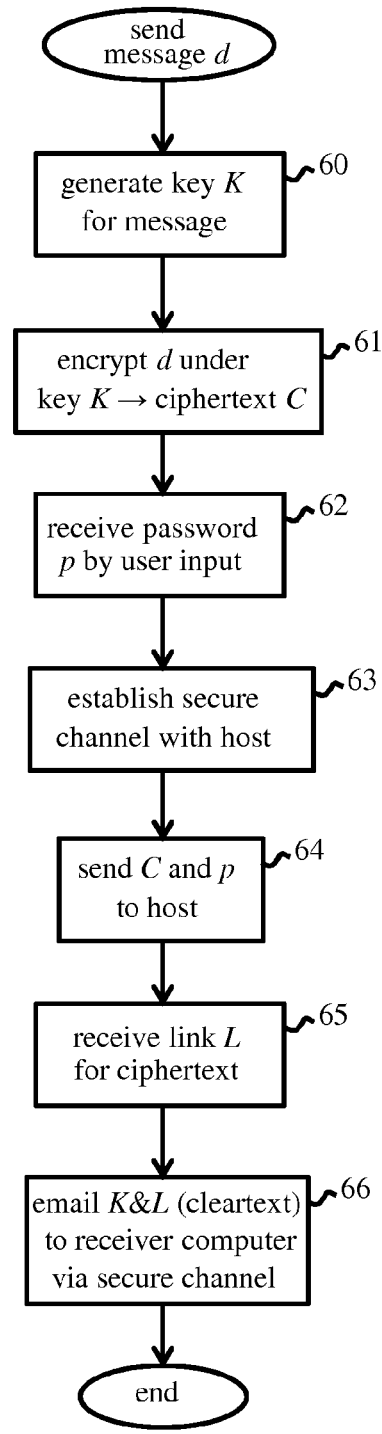
Figures 7A, 7B:
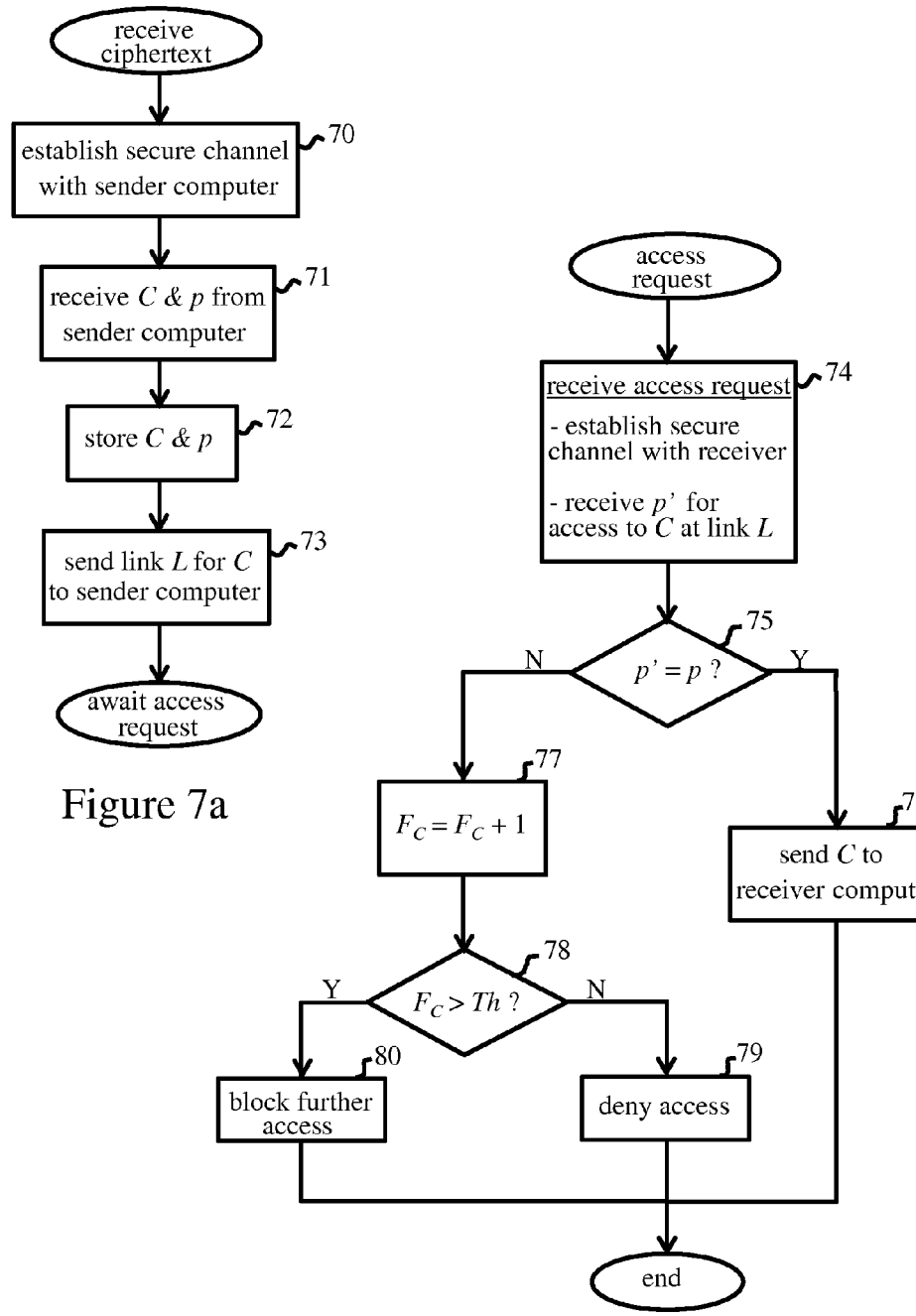
Figure 8:
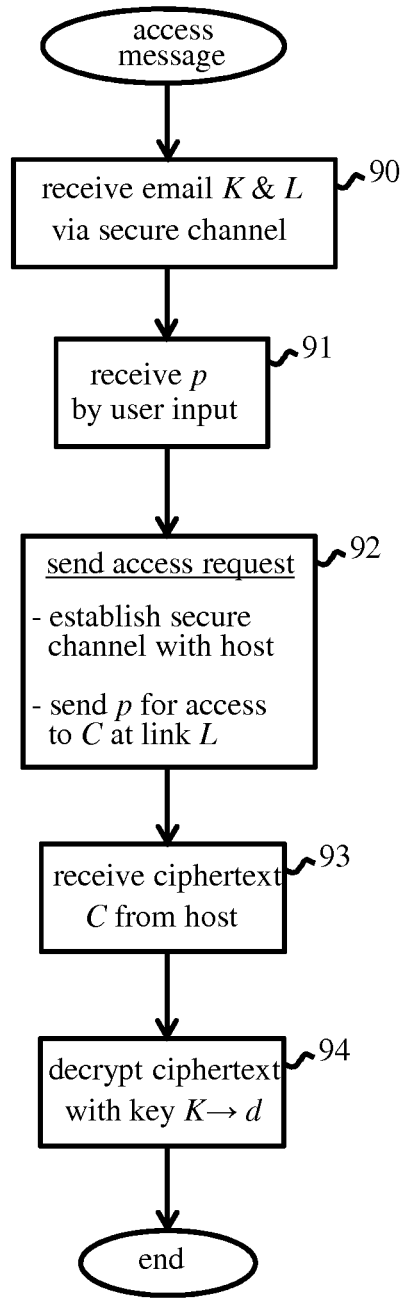

FIG. 1 is a schematic representation of a system for implementing methods embodying the invention FIG. 2 is a generalized schematic of a computer in the FIG. 1 system;

FIG. 3 indicates steps performed by a sender computer of the FIG. 1 system in a first embodiment of the invention;

FIGS. 4a and 4b indicate steps performed by a host computer of the system in the first embodiment;

FIG. 5 indicates steps performed by a receiver computer of the system in the first embodiment;

FIG. 6 indicates steps performed by a sender computer in a second embodiment of the invention;

FIGS. 7a and 7b indicate steps performed by a host computer in the second embodiment; and FIG. 8 indicates steps performed by a receiver computer in the second embodiment.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The system of FIG. 1 comprises a sender computer 1 which can communicate with a receiver computer 2 via a network 3 (where network 3 may in general comprise one or more component networks and/or internetworks including the Internet). The sender and receiver computers 1, 2 may each comprise a general-purpose user computer such as a desktop computer, laptop, tablet, notebook, palmtop, mobile phone, PDA (personal digital assistant), or other computer device. Sender computer 1 can communicate by email with receiver computer 2 via the intermediary of an email provider system 4 connected to network 3. The email provider system 4 may comprise one or more general- or special-purpose email provider computers, each comprising one or more (real or virtual) machines, providing mail server functionality for users. The system also comprises a host computer in the form of host server 5 which is connected to network 3. Host server 5 may be implemented by a general- or special-purpose computer, comprising one or more (real or virtual) machines, providing functionality for implementing operations described below. Host 5 may include one or more computer readable storage media containing executable program instructions for causing the host computer to implement the functionality described. Host 5 provides data storage, represented by disk 6 in the figure, for storing ciphertexts C, and associated access passwords p, on behalf of users as described below. Data storage 6 may in general comprise any convenient data storage apparatus including one or more data storage media. Typical implementations comprise disk storage apparatus comprising one or more disks, such as magnetic or optical disks, which may be internal to host computer 5, e.g. in a hard disk drive, or provided by externally-accessible disk apparatus, e.g. in a disk drive array such as a RAID array.

Host server 5 may be provided by an on-line service provider offering a message exchange service to users. In preferred embodiments, host server 5 offers high-bandwidth connection to users and large volume data storage 6. In some embodiments, host 5 may be implemented as a service in a cloud computing environment and/or data storage 6 may be implemented by one or more storage devices in a cloud-based system. However, host implementation is not limited to a cloud computing environment and can be implemented in conjunction with any other type of computing environment.

The block diagram of FIG. 2 shows an exemplary computing apparatus for implementing a computer 1, 2, 4 or 5 of system 2. The apparatus is shown here in the form of a general-purpose computing device 10. The components of computer 10 may include processing apparatus such as one or more processors represented by processing unit 11, a system memory 12, and a bus 13 that couples various system components including system memory 12 to processing unit 11.

Bus 13 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 10 typically includes a variety of computer readable media. Such media may be any available media that is accessible by computer 10 including volatile and non-volatile media, and removable and non-removable media. For example, system memory 12 can include computer readable media in the form of volatile memory, such as random access memory (RAM) 14 and/or cache memory 15. Computer 10 may further include other removable/non-removable, volatile/non-volatile computer system storage media. By way of example only, storage system 16 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 12 may include at least one program product having one or more program modules that are configured to carry out functions of embodiments of the invention. By way of example, program/utility 17, having a set (at least one) of program modules 18, may be stored in memory 12, as well as an operating system, one or more application programs, other program modules, and program data. Each of the operating system, one or more application programs, other program modules, and program data, or some combination thereof, may include an implementation of a networking environment. Program modules 18 generally carry out the functions and/or methodologies of embodiments of the invention as described herein.

Computer 10 may also communicate with: one or more external devices 19 such as a keyboard, a pointing device, a display 20, etc.; one or more devices that enable a user to interact with computer 10; and/or any devices (e.g., network card, modem, etc.) that enable computer 10 to communicate with one or more other computing devices. Such communication can occur via Input/Output (I/O) interfaces 21. Also, computer 10 can communicate with one or more networks such as a local area network (LAN), a general wide area network (WAN), and/or a public network (e.g., the Internet) via network adapter 22. As depicted, network adapter 22 communicates with the other components of computer 10 via bus 13. It should be understood that although not shown, other hardware and/or software components could be used in conjunction with computer 10. Examples include, but are not limited to: microcode, device drivers, redundant processing units, external disk drive arrays, RAID systems, tape drives, and data archival storage systems, etc.

The flow chart of FIG. 3 indicates steps performed by sender computer 1 in a first message communication process embodying the invention. A user of sender computer 1 (the message sender) wishes to send message data d to a user (the message recipient) of receiver computer 2. The message data d can be constructed at sender computer 1 in any desired manner, e.g. by user input via a keypad of the sender computer. In step 30, sender computer 1 encrypts the message d in dependence on a cryptographic key K, comprising a random cryptographic value, to produce a ciphertext C. Encryption can be performed using any desired encryption scheme as discussed further below. As indicated by step 31 in the figure, sender computer 1 establishes an access password p for the ciphertext C with host server 5. This step can be performed at various stages as discussed below. In step 32, sender computer 1 sends the ciphertext C via network 3 to host server 5. The ciphertext C will be stored by host 5 in association with the access password p as explained below. In step 33, sender computer 1 sends an email (e.g. in response to user instruction) to receiver computer 2 via network 3. This email contains (in the email text or as an attachment) the cryptographic key K in cleartext. As will be understood by those skilled in the art, "cleartext" means that the key K is unencrypted in the email so that the email recipient does not need to use decryption (and hence does not require a decryption key) to read the key in the email. (This does not, however, exclude any encoding not requiring a decryption key by the recipient, and does not exclude any session-based encryption used between the sender computer 1 and email provider system 4, and/or between email provider system 4 and receiver computer 2, which is inherent in the email procedure and transparent to email users).

The random cryptographic value which is comprised in the key K in the above process is independent of the access password p. The key K may consist of the random cryptographic value per se or may be generated using this random cryptographic value. Thus, while the password p could be an element of the key K in some embodiments, the key still comprises a random cryptographic value which is independent of the access password and cannot therefore be determined by knowledge of the password alone. As mentioned earlier, use of such a random cryptographic value inhibits determination of the key by guesswork due to the inherent randomness, or entropy, of the cryptographic value. Such a random cryptographic value typically comprises a string of cryptographically-random bits of sufficient length that it is infeasible for an attacker to guess the resulting cryptographically-random value. The random cryptographic value is preferably a "strong" cryptographic value. Strong cryptographic values are essentially unguessable in that such values cannot be guessed with all possible computing resources available to an attacker. For simplicity, in preferred embodiments the cryptographic key is (wholly) independent of the access password p, whereby the password p is not used at all in generation of the key.

In general, the key K may be pre-stored at sender computer 1 or may be generated at various stages in operation of embodiments of the invention. For example, the key K may be generated or input at sender computer 1 prior to any message exchange operation by the user, or may be generated/input periodically to update the key or allow use of different keys for respective sets of (one or more) messages, e.g. a unique key for each message recipient or each message. Similarly, establishment of the access password p for the ciphertext with host server 5 (step 31) may be performed at various stages in operation. In some embodiments, the sender's ciphertexts may be stored by host 5 in a folder for a sender ID, and a single access password may be established for all ciphertexts in the folder. The password p, which may be input to sender computer 1 by the user, may then be communicated to host 5 in an initial session, establishing the access password for future message exchanges by the user. The password may be refreshed to establish new passwords periodically, or different passwords may be established for different recipients or sets of (one or more) messages, and communicated to host 5 as convenient. In any case, the appropriate access password for a message can be conveniently communicated by the sender to the recipient personally, e.g. by phone, text, mail, face-to-face meeting, or any other secure, yet low-bandwidth, channel, and/or can be based on shared memories such as the name of some mutually-known person or place.

FIGS. 4a and 4b indicate steps performed by host 5 for message communication in this embodiment. FIG. 4a indicates operation of the host in interaction with sender computer 1. In step 40, the host server 5 receives the ciphertext C encrypting the message d from sender computer 1 via network 3. Establishment of the access password p for the ciphertext is represented by step 41 and may be performed at various stages as described above. In step 42, the host 5 stores the ciphertext C in association with the access password p in data storage 6. The password and ciphertext may be stored in any convenient data structure which in some manner defines the password which is associated with a given ciphertext. The host 5 then awaits receipt of an access request for the ciphertext.

FIG. 4*b* indicates operation of the host when the receiver computer 2 attempts to access the ciphertext C. In step 44, the host 5 receives an access request for the ciphertext, and an input password p', from receiver computer 2 via the network 3. The ciphertext to be accessed may be indicated here by reference in the access request to the above-mentioned folder stored by host 5 for the sender ID. For example, the recipient may know the location of this folder (e.g. as "sender-name@XYZ.com" where "XYZ.com" is the host website), this being indicated by receiver computer 2 in the access request. In decision step 45, the host 5 checks whether the input password p' equals the access password p for the folder (and hence the ciphertext C). If not, access is denied in step 46 and the operation terminates. Assuming the correct access password p'=p has been supplied, however, then host 5 sends the ciphertext via the network to the receiver computer 2 in step 47. (If there is more than one ciphertext in the sender folder for access password p here, then all ciphertexts in the folder may be sent in this step). Host operation is then complete.

FIG. 5 indicates steps performed by receiver computer 2 to access a message from sender computer 1. In step 50, the receiver computer 2 receives the email sent by the sender computer via network 3 (step 33 of FIG. 3). To receive this email, the recipient simply logs into his email provider via standard means, e.g. presenting a user name and account password. The received email contains the cryptographic key K in cleartext as described above. In step 51, receiver computer 2 sends an access request for the ciphertext, and the access password p, to the host server 5 via network 3. The access password p may be pre-stored at receiver computer 2, or input by the user here, following communication from the sender as described above. In step 52, the receiver computer receives the ciphertext C (possibly with other ciphertexts in the sender folder associated with password p) from host 5 via the network 3. In step 53, the receiver computer then decrypts the ciphertext C using the cryptographic key K to obtain the original message data d. (If more than one ciphertext is received in this stage, the key K may decrypt only the particular ciphertext C, or may allow the recipient to decrypt all ciphertexts in the folder as desired, depending on selection of keys K for different ciphertexts at sender computer 1).

It will be seen that the above procedure allows convenient message communication between a sender and receiver, using encryption to protect the message, where neither sender nor receiver possesses a public key. The system does not require installation by users of specialist trusted software. The procedure merely requires each of the sender and receiver to have an account with an email provider of system 4, and for the sender to know the receiver's email address. The cryptographic key is emailed in cleartext to the receiver, obviating the need for public/private key pairs. An email provider can see the cleartext key but does not have the ciphertext or know the password to gain access to the ciphertext. The host performs password-based access control for ciphertexts, but does not need to be trusted. The host does not know the cryptographic key, and since the key comprises a random cryptographic value which is independent of the access password, the host cannot feasibly determine the key by a brute-force attack on the password.

A preferred method embodying the invention will now be described in detail with reference to FIGS. 6 through 8. The host and email provider computers 4, 5 in this embodiment have respective certified public keys for authentication purposes. The method employs an encryption scheme as described in general terms above. An encryption scheme ENC=(EKGen, Enc, Dec) consists of three algorithms: a key generation algorithm; an encryption algorithm; and a decryption algorithm. The key generation algorithm K $\xleftarrow{\$}$ EKGen outputs a strong cryptographic value as the cryptographic key K. The encryption algorithm C $\xleftarrow{\$}$ Enc(K, d) computes a ciphertext C on input of a key K and data d. The decryption algorithm Dec takes as input a secret key K, and a ciphertext C, and outputs either the decrypted data d or $\perp$ if decryption failed. Numerous such encryption schemes are known in the art, examples including the AES, Twofish, Serpent, Blowfish, and IDEA schemes. (Fully-fledged encryption tools such as the encrypted zip, Bitlocker, 7-zip, and Veracrypt tools may also be used here, in which case the key K is generated and used as the "passphrase" supplied to the encryption tool. The tool can then derive a further key from the key K for producing the ciphertext).

The flow chart of FIG. 6 indicates steps performed by sender computer 1 in this embodiment. To send message data d to a recipient, the sender computer 1 first generates, in step 60, a unique cryptographic key K for the message data using the key generation algorithm K $\xleftarrow{\$}$ EKGen. In step 61, sender computer 1 uses the encryption algorithm to encrypt d under key K and obtain a ciphertext C $\xleftarrow{\$}$ Enc(K, d).

In step 62 the user chooses a (possibly low-entropy) access password p for the ciphertext, and the password p is received by sender computer 1 via user input. The sender communicates the access password p to the message recipient via a low-bandwidth channel as described above. In step 63, sender computer 1 connects to host 5 via network 3 and established a secure channel for the ensuing session. In this step, the host 5 authenticates to sender computer 1 using its certified public key, and the host and sender computer negotiate a secure session key under which all session communications are encrypted. This step can be implemented in well-known manner using a standard security protocol such as TLS (Transport Layer Security) or SSL (Secure Sockets Layer).

In step 64, sender computer 1 sends the access password p with the ciphertext C via the secure channel to host 5. (In general here, the password may be sent in the same communication or different communications within the same session). In step 65, sender computer 1 receives from host 5 a link L to the ciphertext C stored at host 5. In step 66, sender computer 1 then sends an email to receiver computer 2. This email contains the key K and link L both in cleartext. The email is sent via a secure channel established (e.g. via TLS or SSL) with the email provider computer as described for step 63. Thus, the email provider computer is authenticated via its certified public key and the ensuing session is encrypted under a secure session key. The sender computer operation is then complete.

FIGS. 7*a* and 7*b* indicate operation of the host in this embodiment. In step 70 of FIG. 7*a*, in response to a session request from sender computer 1, the host 5 establishes a secure channel with the sender computer as described above. In step 71, the host receives the ciphertext C encrypting d from sender computer 1 via the secure channel. In step 72, host 5 stores the ciphertext C in association with the access password p in data storage 6. In step 73, host 5 sends the link L to the stored ciphertext via the secure channel to sender computer 1. Host 5 then awaits receipt of an access request for the ciphertext.

In step 74 of FIG. 7*b*, host 5 receives an access request for the ciphertext from receiver computer 2. The access request may be initiated by the recipient clicking on the link L at receiver computer 2, indicating a session request from the receiver computer. The host 5 then establishes a secure channel with receiver computer 2 as described above. The input password p' is received by host 5 from receiver computer 2 as part of the access request, e.g. in response to a prompt sent by host 5 to the receiver computer. In decision step 75, the host 5 checks whether the input password p' equals the access password p for the ciphertext C stored at link address L. If so, host 5 sends the ciphertext C via the secure channel to receiver computer 2 in step 76. If the input password p' is deemed incorrect in step 75, then, in step 77, the host increments a "failed-password" count $F_C$ (initially set-to zero) for the ciphertext C. In step 78, the host 5 then checks if the count $F_C$ exceeds a predetermined threshold value Th. This value may be set in host 5 according to a desired security level. If the threshold Th is not exceeded, then receiver computer 2 is simply denied access in step 79 and the host operation terminates. Returning to step 78, if the threshold Th is exceeded here, i.e. if the receiver computer has given an incorrect password p' in more than Th access requests, then the host 5 blocks all further access to the ciphertext C. In this way, the host 5 implements a throttling mechanism for access requests to the ciphertext in dependence on whether the input password p' equals the access password p. This throttling mechanism frustrates on-line password-guessing attacks by a malicious party trying to access ciphertexts illegally.

FIG. 8 indicates steps performed by receiver computer 2 in this embodiment. In step 90, the receiver computer 2 receives the email sent by the sender computer 1 (step 66 of FIG. 6) containing the key K and link L in cleartext. The email is received via a secure channel established between the email provider computer and receiver computer 2 as described above. The email provider computer is thus authenticated via its certified public key and the email session is encrypted under a secure session key. In step 91, receiver computer 2 receives the access password p (communicated to the recipient as described earlier) via user input. In step 92, the receiver computer sends an access request for the ciphertext C, and sends the access password p, to host 5 via a secure channel as already described. In step 93, receiver computer 2 receives the ciphertext C stored at link address L from host 5 via the secure channel. In step 94, receiver computer 2 decrypts the ciphertext C using the key K to obtain the message data d, i.e., d⇐Dec (K,C).

As with the first embodiment, the foregoing embodiment provides secure message exchange without requiring users to own public/private key pairs or to install specialist trusted software. In addition, the use of link L (which can be emailed in cleartext) in the above embodiment permits different passwords to be used for different messages stored by host 5 as required by the sender, and the recipient may access only the ciphertext stored at link L. A unique key is used for each message for added security, and online password-guessing attacks are frustrated by host 5 as described above. Trust is effectively distributed between the email provider system and the host. As long as at least one of these is honest, no one except the sender and recipient can obtain the message data d. Considering security against outsiders, an outsider neither knows the link nor the corresponding key K. Even if the link is located, access requires the password and the throttling mechanism frustrates multiple online password-guessing attempts. The email provider can read the key K but does not have access to the ciphertext. Even if the email provider sees the link L, a corrupt email provider would need to perform an online attack against the password p stored at host 5. An honest host blocks the account after too many failed retrieval attempts. Host 5 cannot decrypt the ciphertext C as it is encrypted under the cryptographic key K. A corrupt host would be limited to online guessing attacks on the recipients email account, and the email provider will generally lock a user account after too many failed attempts. The system is therefore secure under reasonable assumptions.

In alternative embodiment, the access password for a message can be communicated to the receiver computer in some other manner which is independent of the email provider system via which the key is emailed. For example, sender computer 1 may send the access password to receiver computer 2 via a communications channel which is independent of the email-provider system 4.

In another embodiment, the sender and recipient can agree on the data host 5 whereby access requests are sent only to the pre-agreed host. This frustrates any attempt by a completely malicious email provider to inject bogus emails into the system, specifying a bogus host, in an attempt to retrieve the password. In a further embodiment, the sender computer may produce the ciphertext by encrypting the message data using either an authenticated encryption protocol or a non-malleable encryption protocol. Such protocols, implementations of which will be apparent to those skilled in the art, prevent a completely malicious host 5 from corrupting or altering stored ciphertexts.

Various alternatives and modifications can be made to the embodiments described above. For example, the link L could be sent separately of the key K to receiver computer 2. Operational steps described above may be performed in a different order where appropriate. As a further example, the password-failure threshold Th used in step 78 of FIG. 7b could be set by the sender, e.g. for all messages or specific messages communicated via host 5.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for communicating message data from a sender computer to a receiver computer via a network, the method comprising, at the sender computer:
    encrypting, by a processor, the message data in dependence on a cryptographic key to produce a ciphertext;
    establishing, by the processor, an access password for the ciphertext with a host computer connected to the network and sending the access password to the host computer with the ciphertext;
    sending, by the processor, the ciphertext via the network to the host computer for storage in association with the access password by the host computer; and
    sending, by the processor, over the network, an email message containing said cryptographic key in cleartext, to the receiver computer via the network without requiring said processor to encrypt said cryptographic key;

wherein the cryptographic key comprises a random cryptographic value which is independent of the access password, said receiver computer configured to decrypt the ciphertext using said cryptographic key to obtain said message data.

2. The method as claimed in claim 1 including, at the sender computer:
receiving from the host computer a link to the stored ciphertext; and
sending the link to the receiver computer.

3. The method as claimed in claim 2 including sending said link to the receiver computer by sending an email, containing the link in cleartext, via the network.

4. The method as claimed in claim 3 including, at the sender computer, generating the cryptographic key as a unique key for the message data.

5. The method as claimed in claim 3 including, at the sender computer:
sending the ciphertext to the host computer via a secure communications channel established with the host computer; and
sending the email containing the cryptographic key to the receiver computer via a secure communications channel established with an email-provider computer connected to the network.

6. The method as claimed in claim 3 including, at the sender computer, producing the ciphertext by encrypting the message data using one of an authenticated encryption protocol and a non-malleable encryption protocol.

7. The method as claimed in claim 1 wherein said email is communicated between the sender computer and the receiver computer via an email-provider system connected to the network, and wherein the method includes, at the sender computer, sending the access password to the receiver computer via a communications channel which is independent of the email-provider system.

8. The method as claimed in claim 1 wherein said random cryptographic value is a strong cryptographic value.

9. The method as claimed in claim 1 wherein the cryptographic key is independent of the access password.

10. A computer-implemented method for communicating message data between a sender computer and a receiver computer via a network, the method comprising, at a host computer connected to the network:
receiving, at a hardware processor of said host computer, a ciphertext encrypting the message data using a cryptographic key, from the sender computer via the network;
establishing, by the hardware processor, an access password for the ciphertext with the sender computer, said cryptographic key comprising a random cryptographic value which is independent of the access password;
receiving, by the hardware processor, the access password from the sender computer with the ciphertext; and
storing the ciphertext in association with the access password in a memory associated with said host computer;
receiving, at the hardware processor, an access request for the ciphertext, and an input password, from the receiver computer via the network; and
sending, by the hardware processor, the ciphertext via the network to the receiver computer if the input password equals the access password, said receiver computer obtaining said cryptographic key from said sender computer without requiring said sender computer to encrypt said cryptographic key, and said receiver computer configured to decrypt the ciphertext using said cryptographic key to obtain said message data.

11. The method as claimed in claim 10 including, at the host computer:
sending, by the hardware processor, a link to the stored ciphertext to the sender computer via the network.

12. The method as claimed in claim 11 including, at the host computer, implementing a throttling mechanism for access requests for the ciphertext in dependence on whether the input password equals the access password.

13. The computer-program product for communicating message data between a sender computer and a receiver computer via a network, the computer-program product comprising a computer-readable storage medium having program instructions embodied therein, the program instructions being executable by a host computer connected to the network to cause the host computer to perform a method as claimed in claim 12.

14. A computer-implemented method for receiving message data from a sender computer via a network, wherein the message data is encrypted, in dependence on a cryptographic key comprising a random cryptographic value, in a ciphertext produced by the sender computer and the ciphertext is stored by a host computer connected to the network in association with an access password established at said sender computer and communicated to said host computer by said sender computer, said cryptographic key comprising a random cryptographic value which is independent of the access password, the method comprising, at a receiver computer connected to the network:
receiving, at a hardware processor of said receiver computer, an email containing said cryptographic key in cleartext, from the sender computer via the network, said email is communicated between the sender computer and the receiver computer via an email-provider system connected to the network, and said sender computer communicating said cryptographic key to the receiver computer in said e-mail without requiring said sender computer to encrypt said cryptographic key;
receiving, at the receiver computer, from said sender computer, said access password independently of said email-provider system;
sending, by the hardware processor, an access request for the ciphertext, and the access password, to the host computer via the network;
receiving, by the hardware processor, the ciphertext from the host computer via the network; and
decrypting, by the hardware processor, the ciphertext using said cryptographic key to obtain said message data.

15. The method as claimed in claim 14 including, at the receiver computer:
receiving from the sender computer a link to the stored ciphertext; and
in said access request, requesting access to the ciphertext via said link.

16. The method as claimed in claim 15 including receiving said link in cleartext in an email from the sender computer.

17. A computer-implemented method for communicating message data from a sender computer to a receiver computer via a network, the method comprising
at the sender computer: encrypting the message data in dependence on a cryptographic key to produce a ciphertext; establishing an access password for the ciphertext with a host computer connected to the network; sending the ciphertext via the network to the host computer; sending, by the sender computer, the established access password to the host computer with the ciphertext; and sending an email, containing said cryptographic key in cleartext, to the receiver computer via the network without requiring said sender computer to encrypt said cryptographic key, wherein the cryptographic key comprises a random cryptographic value which is independent of the access password, at the host computer, receiving the ciphertext from the sender computer and storing the ciphertext in association with the access password, at the receiver computer, receiving said email from the sender computer and sending an access request for the ciphertext, and an input password, to the host computer via the network, at the host computer, receiving said access request and the input password from the receiver computer and sending the ciphertext to the receiver computer via the network if the input password equals the access password, and at the receiver computer, receiving the ciphertext from the host computer and decrypting the ciphertext using said cryptographic key to obtain said message data.

18. The method as claimed in claim 17 wherein said email is communicated between the sender computer and the receiver computer via an email-provider system connected to the network, and wherein the method includes, at the receiver computer, receiving said access password independently of said email-provider system.

19. The method as claimed in claim 17 including:
at the host computer, sending a link to the stored ciphertext to the sender computer via the network; and
at the sender computer, sending the link to the receiver computer.

20. The method as claimed in claim 19 including, at the sender computer, sending said link to the receiver computer by sending an email, containing the link in cleartext, via the network.

21. The method as claimed in claim 20 including, at the sender computer, generating the cryptographic key as a unique key for the message data.

22. The method as claimed in claim 21 including, at the host computer, implementing a throttling mechanism for access requests from the receiver computer in dependence on whether the input password equals the access password.

* * * * *